(12) United States Patent
Gady et al.

(10) Patent No.: US 8,919,101 B2
(45) Date of Patent: Dec. 30, 2014

(54) SELECTIVE CATALYTIC REDUCTION DEVICE CONTROL METHODS AND SYSTEMS

(75) Inventors: Kevin Andrew Gady, Ypsilanti, MI (US); Joshua Clifford Bedford, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 213 days.

(21) Appl. No.: 13/403,278

(22) Filed: Feb. 23, 2012

(65) Prior Publication Data

US 2013/0219867 A1 Aug. 29, 2013

(51) Int. Cl.
*F01N 3/00* (2006.01)
*F01N 3/10* (2006.01)

(52) U.S. Cl.
USPC ............ 60/286; 60/276; 60/295; 60/301; 60/303

(58) Field of Classification Search
USPC ............ 60/276, 286, 295, 301, 303
See application file for complete search history.

(56) References Cited

U.S. PATENT DOCUMENTS

| | | | | |
|---|---|---|---|---|
| 6,427,439 | B1 * | 8/2002 | Xu et al. ............ | 60/286 |
| 2003/0005683 | A1 * | 1/2003 | Lambert et al. ......... | 60/276 |

* cited by examiner

*Primary Examiner* — Audrey K Bradley
(74) *Attorney, Agent, or Firm* — Cantor Colburn LLP

(57) ABSTRACT

An exhaust system is provided. The exhaust system includes a first sensor that senses a level of nitrous oxide (NOx) in exhaust gas and generates a first sensor signal. A second sensor senses a level of ammonia (NH3) in the exhaust gas and generates a second sensor signal. A control module receives the first sensor signal and the second sensor signal, determines a desired reductant dosage based on the first sensor signal and the second sensor signal, and generates an injector control signal based on the desired reductant dosage.

11 Claims, 4 Drawing Sheets

SELECTIVE CATALYTIC REDUCTION DEVICE CONTROL METHODS AND SYSTEMS

FIELD OF THE INVENTION

The subject invention relates to methods, systems, and computer program products for injecting reductant into an exhaust system that includes a selective catalytic reduction device.

BACKGROUND

Exhaust gas emitted from an internal combustion engine is a heterogeneous mixture that contains gaseous emissions such as carbon monoxide (CO), unburned hydrocarbons (HC) and oxides of nitrogen (NOx) as well as condensed phase materials (liquids and solids) that constitute particulate matter. Catalyst compositions typically disposed on catalyst supports or substrates are provided in an engine exhaust system to convert certain, or all of these exhaust constituents into non-regulated exhaust gas components.

In some cases, one or more selective catalytic reduction devices (SCR) are provided to reduce the amount of NOx in the exhaust. The SCR devices make use of ammonia (NH3) or other reductant to reduce the NOx. For example, when the proper amount of NH3 is available at the SCR device under the proper conditions, the $NH_3$ reacts with the NOx in the presence of an SCR catalyst to reduce the NOx emissions to, for example, nitrogen.

Accordingly, it is desirable to provide systems and methods for controlling an injection of reductant into the engine exhaust stream to reduce the NOx emissions.

SUMMARY OF THE INVENTION

In one exemplary embodiment, an exhaust system is provided. The exhaust system includes a first sensor that senses a level of nitrous oxide (NOx) in exhaust gas and generates a first sensor signal. A second sensor senses a level of ammonia (NH3) in the exhaust gas and generates a second sensor signal. A control module receives the first sensor signal and the second sensor signal, determines a desired reductant dosage based on the first sensor signal and the second sensor signal, and generates an injector control signal based on the desired reductant dosage.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
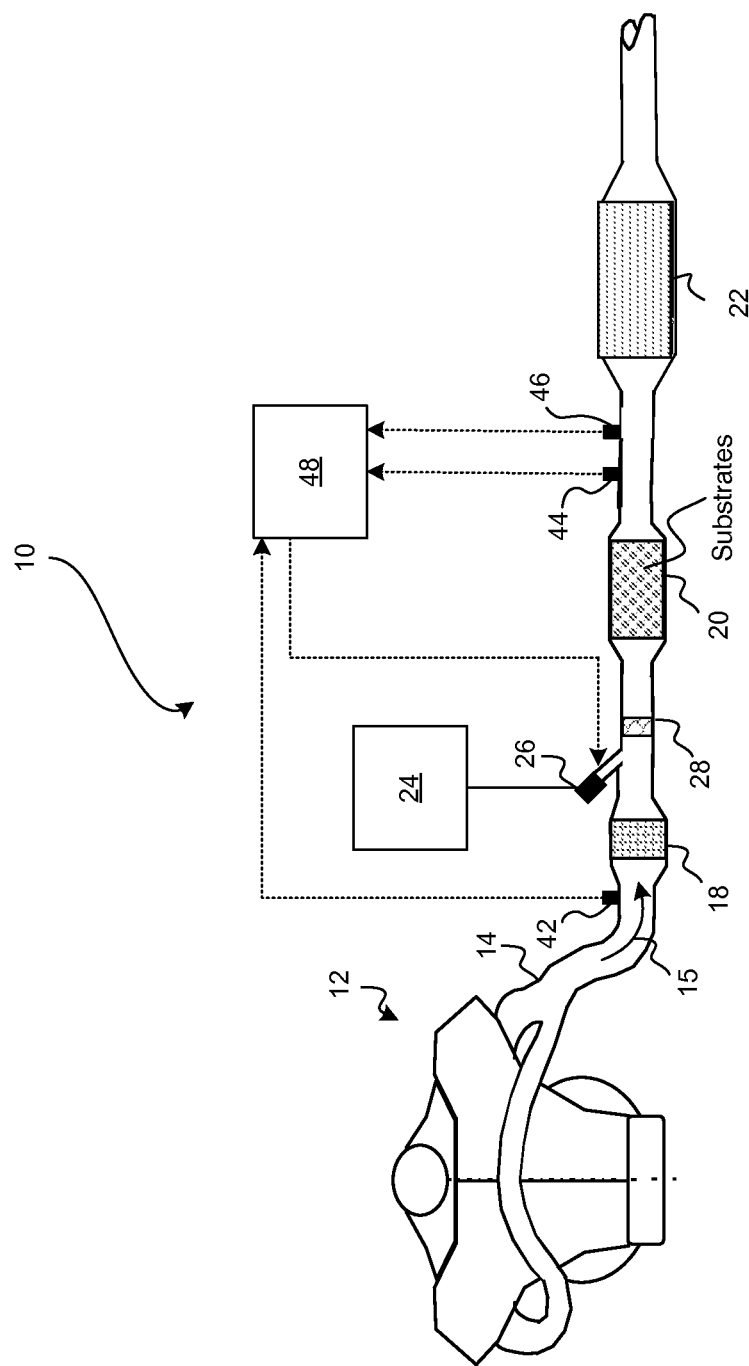
FIG. 1 is a functional block diagram of an internal combustion engine and associated exhaust treatment system that includes a selective catalytic reduction device control system in accordance with exemplary embodiments.

The following description is merely exemplary in nature and is not intended to limit the present disclosure, its application or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Referring now to FIG. 1, an exemplary embodiment is directed to an exhaust gas treatment system 10, for the reduction of regulated exhaust gas constituents of an internal combustion engine 12. The exhaust gas treatment system 10 described herein can be implemented in various engine systems implementing a particulate filter. Such engine systems may include, but are not limited to, diesel engine systems, gasoline direct injection systems, and homogeneous charge compression ignition engine systems.

The exhaust gas treatment system 10 generally includes one or more exhaust gas conduits 14, and one or more exhaust treatment devices. The exhaust treatment devices include, for example, an oxidation catalyst device (OC) 18, a selective catalytic reduction device (SCR) 20, and a particulate filter device (PF) 22. As can be appreciated, the exhaust gas treatment system 10 of the present disclosure may include the SCR 20 and various combinations of one or more of the exhaust treatment devices shown in FIG. 1, and/or other exhaust treatment devices (not shown), and is not limited to the present example.

In FIG. 1, the exhaust gas conduit 14, which may comprise several segments, transports exhaust gas 15 from the engine 12 to the various exhaust treatment devices of the exhaust gas treatment system 10. The OC 18 may include, for example, a flow-through metal or ceramic monolith substrate. The substrate may be packaged in a shell or canister having an inlet and an outlet in fluid communication with exhaust gas conduit 14. The substrate can include an oxidation catalyst compound disposed thereon. The oxidation catalyst compound may be applied as a wash coat and may contain platinum group metals such as platinum (Pt), palladium (Pd), rhodium (Rh) or other suitable oxidizing catalysts, or combination thereof. The OC 18 is useful in treating unburned gaseous and non-volatile HC and CO, which are oxidized to form carbon dioxide and water.

The SCR 20 may be disposed downstream of the OC 18. In a manner similar to the OC 18, the SCR 20 may also include, for example, one or more flow-through ceramic or metal monolith substrates. The substrates may be packaged in a shell or canister having an inlet and an outlet in fluid communication with exhaust gas conduit 14. The substrates can include an SCR catalyst composition applied thereto. The SCR catalyst composition can contain a zeolite and one or more base metal components such as iron (Fe), cobalt (Co), copper (Cu) or vanadium (V) which can operate efficiently to convert NOx constituents in the exhaust gas 15 in the presence of a reductant such as ammonia (NH3).

An NH3 reductant may be supplied from a reductant supply source 24 and may be injected into the exhaust gas conduit 14 at a location upstream of the SCR 20 using an injector 26, or other suitable method of delivery of the reductant to the exhaust gas 15. The reductant may be in the form of a gas, a liquid, or an aqueous urea solution and may be mixed with air in the injector 26 to aid in the dispersion of the injected spray. A mixer or turbulator 28 may also be disposed within the exhaust conduit 14 in close proximity to the injector 26 to further assist in thorough mixing of the reductant with the exhaust gas 15.

Various sensors sense observable conditions of the exhaust treatment system 10. For example, a first NOx sensor 42 senses a level of NOx present in the exhaust gas 15 at a location upstream from the SCR 20 and generates signals based thereon. A second NOx sensor 44 senses a level of NOx present in the exhaust gas 15 at a location downstream from the SCR 20 and generates signals based thereon. An NH3 sensor 46 senses a level of NH3 present in the exhaust gas 15 at a location downstream of the SCR 20 and generates signals based thereon. A control module 48 receives the signals and controls a dosing amount by the injector 26 based on SCR control and methods of the present disclosure. In particular, the control module 48 evaluates the sensor signals from the NH3 sensor 46 and the NOx sensors 42, 44 to determine a dosing amount. The control module 48 generates control signals to the injector 26 based on the dosing amount. As can be appreciated, one or both of the sensor signals from the NOx sensors 42, 44 may be modeled by the control module 48 or other control module (not shown) based on other sensor signals (not shown).

Figure 2:
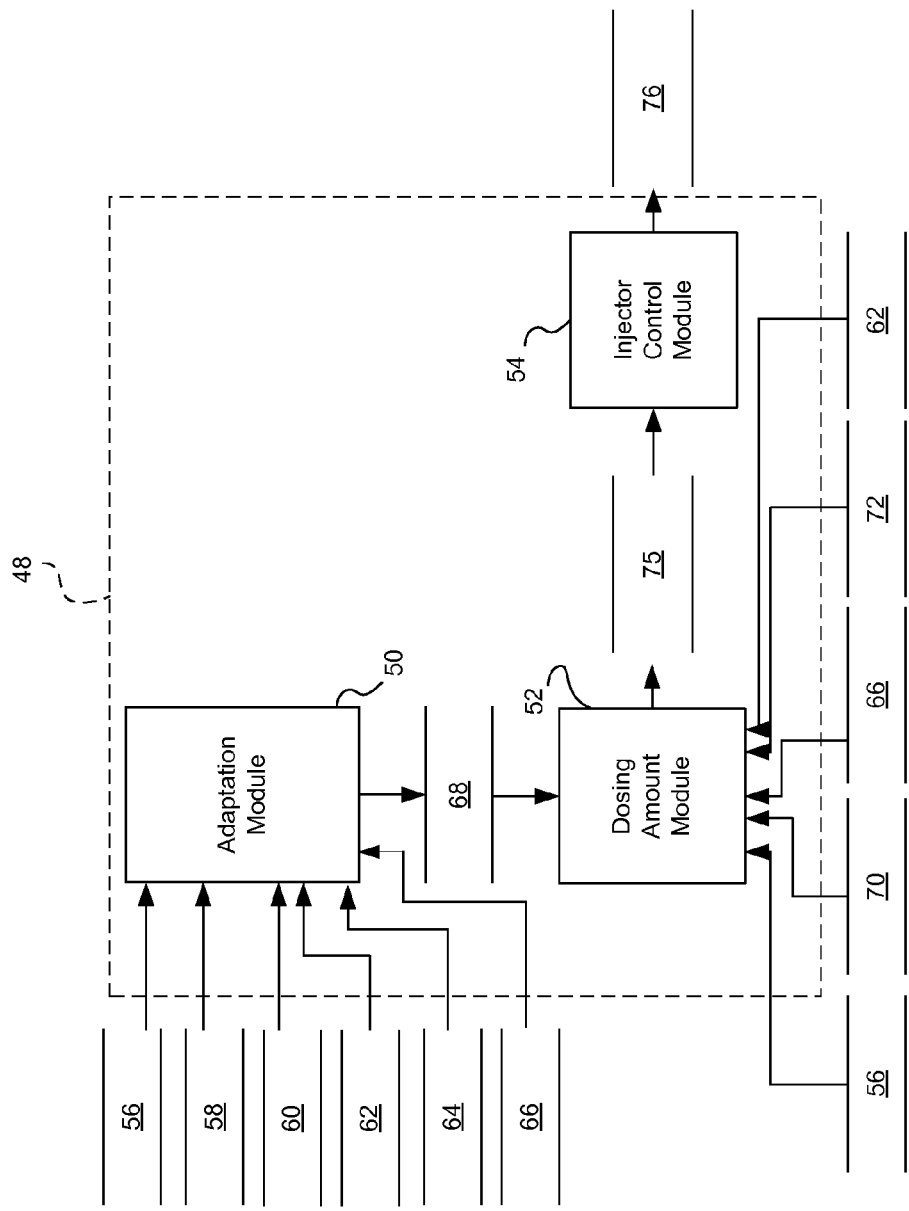
FIG. 2 is a dataflow diagram illustrating a selective catalytic reduction device control system in accordance with exemplary embodiments.

Referring now to FIG. 2, a dataflow diagram illustrates various embodiments of a SCR control system that may be embedded within the control module 48. Various embodiments of SCR systems according to the present disclosure may include any number of sub-modules embedded within the control module 48. As can be appreciated, the sub-modules shown in FIG. 2 may be combined and/or further partitioned to similarly control the injection of the reductant into the exhaust system 10 (FIG. 1). Inputs to the system may be sensed from the engine 12 (FIG. 1), received from other control modules (not shown), and/or determined/modeled by other sub-modules (not shown) within the control module 48. In various embodiments, the control module 48 includes an adaptation module 50, a dosing amount determination module 52, and an injector control module 54.

The adaptation module 50 receives as input a SCR temperature 56, an exhaust flow rate 58, a modeled NOx 60, sensed NOx 62 (e.g., a NOx value downstream from the SCR), a modeled NH3 64, and sensed NH3 66. Based on the inputs 56-66, the adaptation module 50 determines a correction value 68 based on a storage of reductant in the SCR 20 (FIG. 1).

Figure 3:
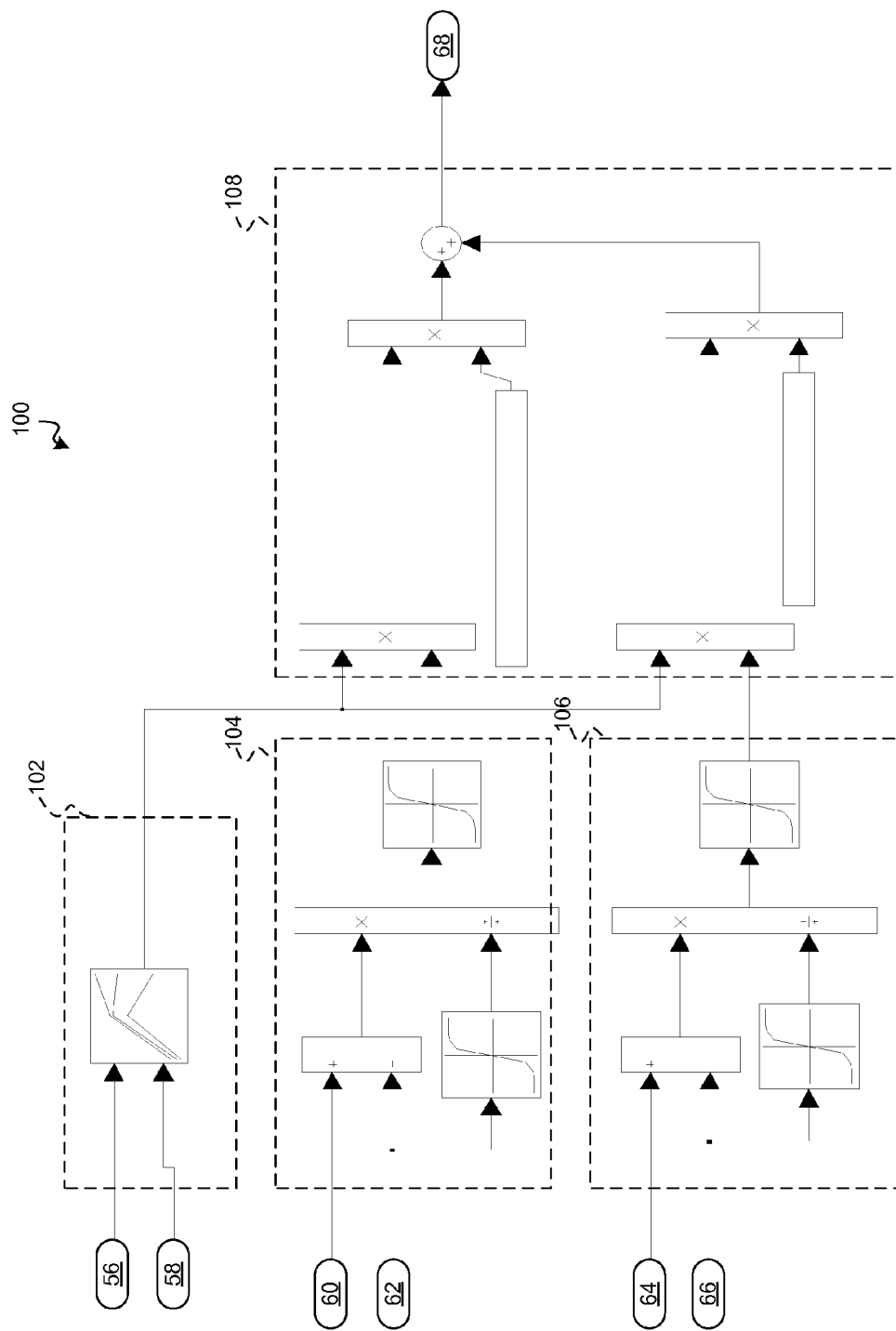
FIG. 3 is a flowchart illustrating a selective catalytic reduction device control method in accordance with exemplary embodiments.

For example, as shown in the method 100 of FIG. 3, the adaptation module 50 determines a base correction value based on the SCR temperature 56 and the exhaust flow rate 58 using, for example, a lookup table that is indexed by the SCR temperature 56 and the exhaust flow rate 58 as shown at 102. The adaptation module 50 then determines a NOx deviation and a NH3 deviation based on the modeled NOx 60 and the sensed NOx 62 and the modeled NH3 64 and the sensed NH3 66, as shown at 104 and 106 respectively. The adaptation module 50 then applies the NOx deviation and the NH3 deviation to the base correction value to determine the correction value 68 as shown at 108. As can be appreciated, when the SCR comprises multiple substrates, the adaptation module 50 can compute a partial correction value for each substrate of the SCR 20 (FIG. 1) depending on the size of the substrate and sum the partial correction values to determine the correction value 68.

With reference back to FIG. 2, the dosing amount module 52 receives as input the SCR temperature 56, an exhaust space velocity 70, a sensed downstream NH3 66, sensed upstream NOx 72, sensed downstream NOx 62, and the correction value 68. Based on the inputs 56, 62, and 66-72, the dosing amount module 52 determines a desired reductant to NOx ratio 74. For example, the dosing amount module 52 determines a feed forward reductant to NOx ratio and adjusts the feed forward reductant to NOx ratio based on reductant slip, NOx conversion, and reductant storage correction value 68.

Figure 4:
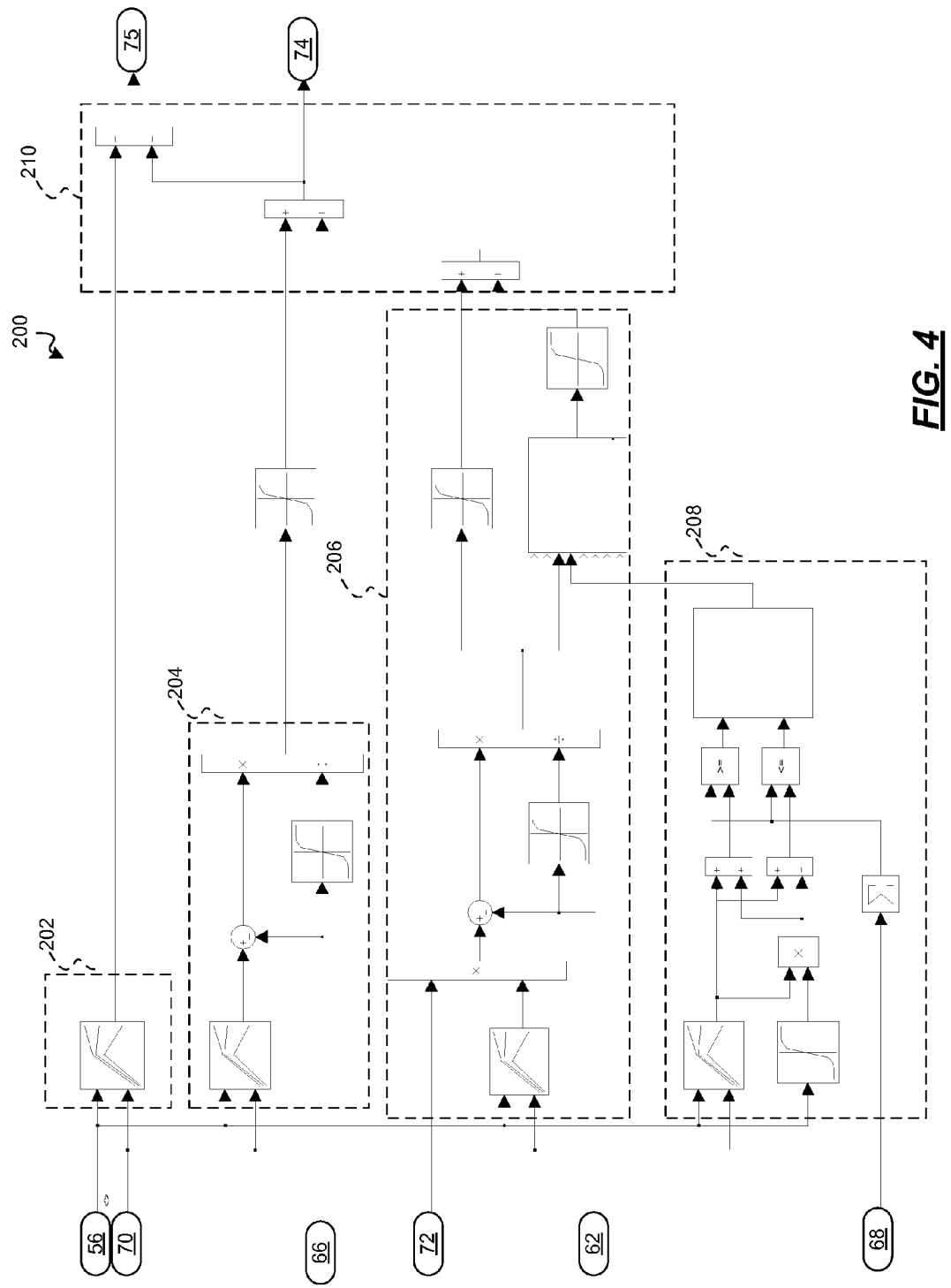
FIG. 4 is a process flow for determining a desired reluctant to oxides of nitrogen (NOx) ratio.

As shown in the example method 200 of FIG. 4, the dosing amount module 52 determines a feed forward reductant to NOx ratio at 202 using, for example, a lookup table indexed by the SCR temperature 56, and the exhaust space velocity 70, or other methods. The dosing amount module 52 determines a gain based on a reductant slip set point at 204 using the SCR temperature 56, and the sensed downstream NH3 66. The dosing amount module 52 determines proportional and integral gains based on a NOx conversion set point at 206 using the sensed upstream NOx 72, the SCR temperature 56, and the sensed downstream NOx 62. In various embodiments, the determination of the integral gain can be limited by the storage correction value 68 as shown at 208. The dosing amount module 52 then applies the gains to the feed forward reductant to NOx ratio to determine the desired reductant to NOx ratio 75 at 210.

With reference back to FIG. 2, the injector control module 54 receives as input the desired reductant to NOx ratio 75. Based on the desired reductant to NOx ratio 75, the injector control module 54 generates control signals 76 to the injector 26 (FIG. 1) to control the injection of the reductant into the exhaust stream 10. As can be appreciated, various other inputs (not shown) may be taken into account to determine a timing of generating the control signals 76.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. An exhaust system that receives exhaust gas from an engine, comprising:
   a selective catalytic reduction (SCR) device that comprises a plurality of substrates;
   a control module comprising a processor coupled to a memory, the control module configured to:
     generate a partial adjustment value for each of the plurality of substrates based on a sensed nitrous oxide (NOx) value and a sensed ammonia (NH3) value;
     generate an adjustment value by summing the plurality of partial adjustment values;
     adjust a desired reductant dosage using the adjustment value; and
     generate an injector control signal based on the adjusted desired reductant dosage; and
   an injector that receives the injector control signal and injects reductant into the exhaust gas according to the injector control signal.

2. The exhaust system of claim 1, wherein the adjustment value is a gain value.

3. The exhaust system of claim 1, wherein the control module is configured to determine the desired reductant dosage by determining an NH3 to NOx ratio, and wherein the control module is configured to adjust the desired reductant dosage by applying the adjustment value to the NH3 to NOx ratio.

4. The exhaust system of claim 1, further comprising a first sensor that senses a level of NH3 in the exhaust gas downstream of the SCR and that generates a first sensor signal based thereon, wherein the control module is configured to determine the sensed NH3 value from the first sensor signal.

5. The exhaust system of claim 4, further comprising a second sensor that senses a level of NOx in the exhaust gas downstream of the SCR and generates a second sensor signal based thereon and wherein the control module is configured to determine the sensed NOx value from the second sensor signal.

6. A system, comprising:
an engine that generates exhaust gas;
an exhaust system that receives the exhaust gas from the engine, and includes an injector that injects reductant into the exhaust gas and a selective catalytic reduction (SCR) device that comprises a plurality of substrates; and
a control module comprising a processor coupled to a memory, the control module configured to:
generate a partial adjustment value for each of the plurality of substrates based on a sensed nitrous oxide (NOx) value and a sensed ammonia (NH3) value;
generate an adjustment value by summing the plurality of partial adjustment values;
adjust a desired reductant dosage using the adjustment value; and
generate control signals to the injector based on the adjusted desired reductant dosage.

7. The system of claim 6, wherein the adjustment value is a gain value.

8. The system of claim 6, wherein the control module is configured to generate a partial adjustment value for a particular substrate of the SCR based on a size of the particular substrate.

9. The system of claim 6, wherein the control module is configured to determine the desired reductant dosage by determining an NH3 to NOx ratio, and wherein the control module is configured to adjust the desired reductant dosage by applying the adjustment value to the NH3 to NOx ratio.

10. The system of claim 6, wherein the exhaust system further comprises:
a first sensor that senses a level of NH3 in the exhaust gas exiting the SCR and that generates a first sensor signal based thereon; and
wherein the control module is configured to determine the sensed NH3 value from the first sensor signal.

11. The system of claim 10, wherein the exhaust system further comprises a second sensor that senses a level of NOx in the exhaust gas exiting the SCR and generates a second sensor signal based thereon, and wherein the control module is configured to determine the sensed NOx value from the second sensor signal.

* * * * *